United States Patent
Kovie et al.

(10) Patent No.: US 10,864,805 B2
(45) Date of Patent: Dec. 15, 2020

(54) ENERGY ABSORBER FOR VEHICLE DOORS

(71) Applicant: Nissan North America, Inc., Franklin, TN (US)

(72) Inventors: David Kovie, Livonia, MI (US); Richard Dryja, Canton, MI (US); David Iozzo, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 147 days.

(21) Appl. No.: 16/258,242

(22) Filed: Jan. 25, 2019

(65) Prior Publication Data

US 2020/0238798 A1    Jul. 30, 2020

(51) Int. Cl.
*B60J 5/04* (2006.01)

(52) U.S. Cl.
CPC ........... *B60J 5/0433* (2013.01); *B60J 5/0413* (2013.01); *B60J 5/0451* (2013.01); *B60J 5/0452* (2013.01); *B60J 5/0419* (2013.01)

(58) Field of Classification Search
CPC ...... B60J 5/0413; B60J 5/0416; B60J 5/0419; B60J 5/042; B60J 5/0425; B60J 5/0433; B60J 5/0451; B60J 5/0452
USPC .......................................... 296/146.5, 146.6
See application file for complete search history.

(56) References Cited

U.S. PATENT DOCUMENTS

| | | | | |
|---|---|---|---|---|
| 5,542,738 | A * | 8/1996 | Walker | B60J 5/0451 296/146.6 |
| 5,865,496 | A * | 2/1999 | Odan | B60J 5/0425 280/751 |
| 7,857,375 | B2 * | 12/2010 | Huttsell | B60R 21/0428 296/146.6 |
| 10,676,970 | B2 * | 6/2020 | Strigle | E05B 77/10 |
| 2001/0017476 | A1 | 8/2001 | Nishikawa et al. | |
| 2007/0013206 | A1 * | 1/2007 | Huttsell | B60J 5/0451 296/146.6 |
| 2011/0169302 | A1 | 7/2011 | Deng et al. | |
| 2013/0074413 | A1 * | 3/2013 | Moriya | B60J 5/0433 49/394 |

FOREIGN PATENT DOCUMENTS

| | | | | |
|---|---|---|---|---|
| DE | 102014214321 A1 * | 1/2015 | | B60J 5/0419 |
| DE | 102014214321 A1 | 1/2015 | | |
| EP | 1977936 A2 | 10/2008 | | |
| JP | 2012111380 A | 6/2012 | | |
| JP | 2013237294 A | 11/2013 | | |
| RU | 180276 U1 | 6/2018 | | |

* cited by examiner

*Primary Examiner* — Jason S Daniels
(74) *Attorney, Agent, or Firm* — Young Basile Hanlon & MacFarlane, P.C.

(57) ABSTRACT

A vehicle door is described, including: a bracket that is configured to support a window during opening and closing; a door locking mechanism that is positioned proximate (e.g., near or adjacent to) the bracket; and an absorption member that is configured and positioned to absorb energy from an impact with the vehicle door to thereby protect the door locking mechanism. The absorption member includes a body defining an internal channel that is configured to receive the bracket in an interference fit such that the absorption member is fixedly securable to the bracket.

20 Claims, 3 Drawing Sheets

FIG. 1
FIG. 2
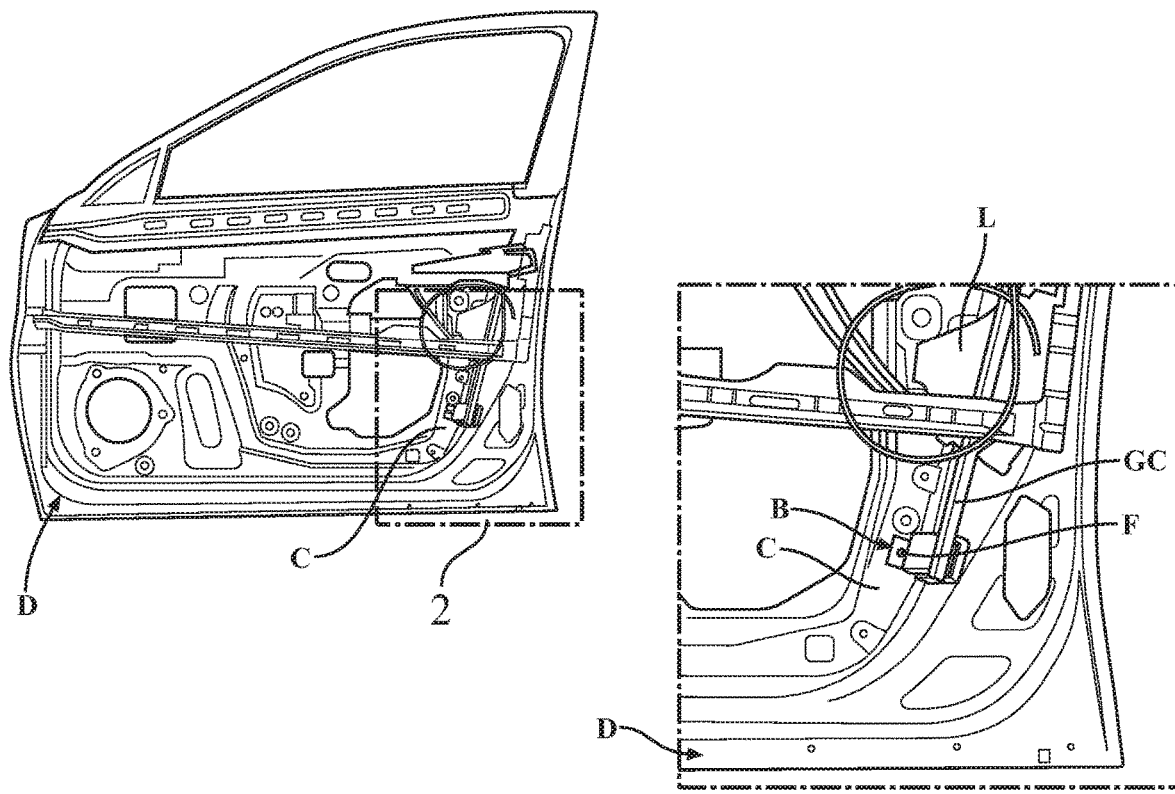
FIG. 3
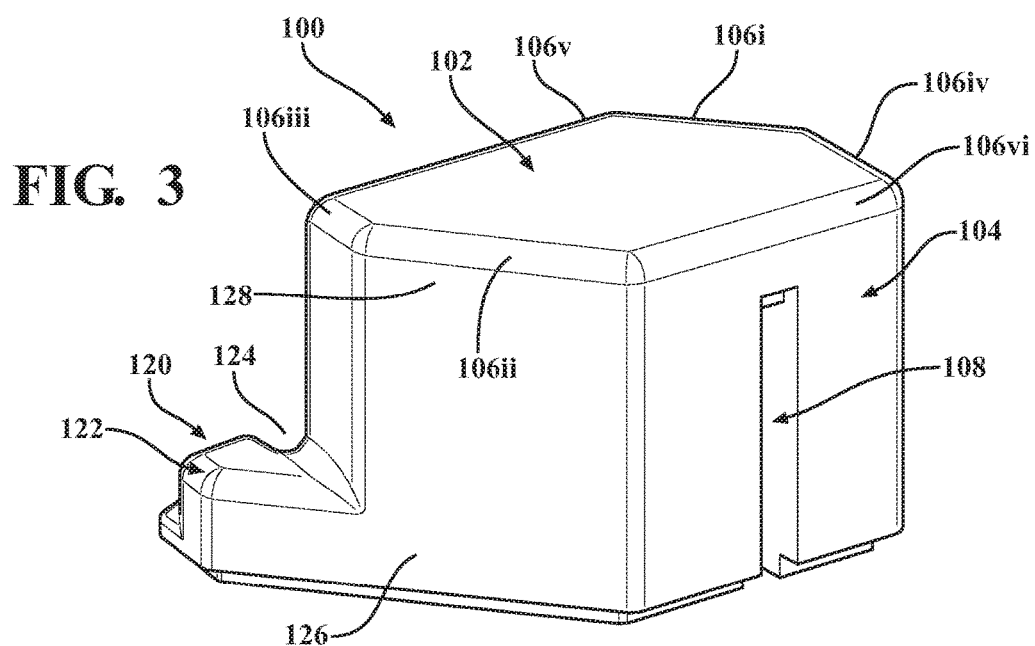

ENERGY ABSORBER FOR VEHICLE DOORS

TECHNICAL FIELD

The present disclosure relates generally to vehicles, and, more specifically, to structures that are mountable within vehicle doors to absorb energy from an impact.

BACKGROUND

Vehicle doors generally house a variety of internal components, including, for example, locking mechanisms, window guides, etc. When the vehicle door is subjected to an impact, however, such as a side-impact with another vehicle, the door cavity housing these internal components can collapse, and the internal components can be crushed, damaged, and/or dislocated.

To address this issue, the present disclosure describes various embodiments of energy absorbers that are mountable within vehicle doors to absorb the energy (force) of the impact and/or resist collapse of the vehicle door to thereby reduce (if not entirely prevent) damage to, and/or dislocation of, the various internal components.

SUMMARY

In one aspect of the present disclosure, a vehicle door is described that includes: a bracket that is configured to support a window during opening and closing; a door locking mechanism that is positioned proximate (e.g., near or adjacent to) the bracket; and an absorption member that is configured and positioned to absorb energy from an impact with the vehicle door to thereby protect the door locking mechanism. The absorption member includes a body defining an internal channel that is configured to receive the bracket in an interference fit such that the absorption member is fixedly securable to the bracket (i.e., without the use of any mechanical fasteners, adhesives, or the like).

In certain embodiments, the body of the absorption member may include a deformable material (e.g., an expanded polypropylene foam).

In certain embodiments, the absorption member may include a plurality of stabilizers (e.g., ribs) that extend inwardly from the body into the internal channel. For example, in certain embodiments, the plurality of stabilizers may include a first stabilizer that extends inwardly from a first surface of the body, and a second stabilizer that extends inwardly from a second surface of the body that generally faces the first surface.

In certain embodiments, the internal channel may include a first portion that extends along a first axis, and a second portion that extends along a second axis. In such embodiments, the second axis may intersect the first axis so as to subtend an angle that lies substantially within the range of approximately 115° to 155°.

In certain embodiments, the absorption member may further include a location element that extends outwardly from the body. In such embodiments, the location element may be configured for engagement with the bracket (and/or any fasteners used to secure the bracket within the vehicle door). For example, in certain embodiments, the location element may extend from the body so as to define a receiving space that is configured to accommodate the bracket (and/or the fastener(s)).

In certain embodiments, the location element may extend from the body such that the location element is positionable beneath the bracket upon securement of the absorption member to the bracket.

In another aspect of the present disclosure, an absorption member is described that is configured for mounting proximate (e.g., near or adjacent to) a locking mechanism of a vehicle door including a window that is supported by a bracket during opening and closing. The absorption member has a body that includes a deformable material, which allows the absorption member to absorb energy from an impact with the vehicle door to thereby protect the locking mechanism. The body includes an internal channel that is configured to receive the bracket, wherein the internal channel defines a first width, and the bracket defines a second width that is greater than the first width. Due to the larger width of the bracket, upon insertion of the bracket into the internal channel, the internal channel is expanded to create an interference fit with the bracket and thereby secure the absorption member to the bracket (i.e., without the use of any mechanical fasteners, adhesives, or the like).

In certain embodiments, the absorption member may include a plurality of internal stabilizers that are configured for contact with the bracket. For example, in certain embodiments, the plurality of internal stabilizers may be configured as ribs that extend inwardly into the internal channel.

In certain embodiments, the absorption member may further include a location element that extends outwardly from the body and is configured for engagement with the bracket (and/or any fasteners used to secure the bracket within the vehicle door). For example, in certain embodiments, the location element may extend from the body so as to define a receiving space that is configured to accommodate the bracket (and/or the fastener(s)).

In another aspect of the present disclosure, a method of assembling a vehicle door is disclosed that includes: positioning a window guide channel within the vehicle door; fixedly connecting a bracket to the vehicle door such that the bracket supports the window guide channel; and mounting an absorption member to the bracket via insertion of the bracket into a channel defined by the absorption member such that the bracket is received in an interference fit to thereby secure the absorption member to the bracket.

In certain embodiments, mounting the absorption member to the bracket may include deforming a plurality of internal stabilizers via engagement with the bracket.

In certain embodiments, mounting the absorption member to the bracket may include positioning the absorption member such that a first internal stabilizer is positioned adjacent a first side of the bracket, and a second internal stabilizer is positioned adjacent a second, opposite side of the bracket.

In certain embodiments, mounting the absorption member to the bracket may include positioning the absorption member such that a location element extending outwardly from a body of the absorption member engages the bracket (and/or any fasteners used to secure the bracket within the vehicle door).

BRIEF DESCRIPTION OF THE DRAWINGS

According to common practice, the various features of the drawings may not be to scale, and may be arbitrarily expanded or reduced for clarity.

FIG. 1 is a side, plan view of a vehicle door including a locking mechanism and a bracket that is configured to support a window during opening and closing.

FIG. 2 is an enlargemement of the area of detail indicated in FIG. 1.

FIG. 3 is a top, perspective view of one embodiment of an absorption member configured for mounting to the bracket in the vehicle door.

DETAILED DESCRIPTION

Figure 4:
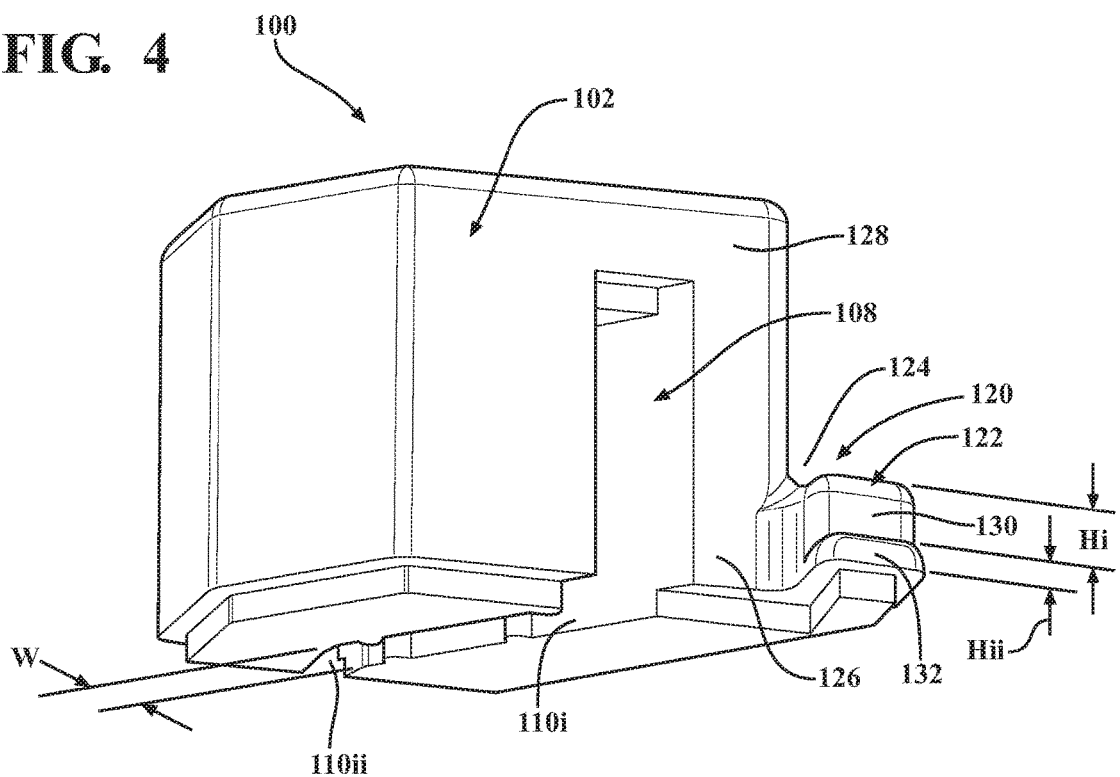
FIG. 4 is a bottom, perspective view of the absorption member.

Vehicle doors typically include a variety of internal components, such as locking mechanisms and window guides that support the windows during opening and closing. These window guides are often supported by (e.g., connected to) a bracket or other such suitable structure. The present disclosure describes various embodiments of absorption members that are configured for mounting within the cavity of a vehicle door (e.g., to the brackets supporting the window guides) to absorb energy from an impact, such as a side-impact with another vehicle, to mitigate (if not entirely prevent) collapse of the door cavity, as well as damage to, or dislocation of, the various internal components of the vehicle door (e.g., the locking mechanism, the window guide, etc.). To facilitate the absorption of energy from the impact, the absorption members described herein include (e.g., are formed from) one or more deformable materials, such as a foam (e.g., an expanded polypropylene foam). Additionally, the absorption members described herein are configured for direct mounting to the brackets to eliminate the need for any mechanical fasteners, adhesives, or other such connectors, thereby simplifying installation, maintenance, and/or replacement, and reducing costs.

To mount the absorption member to the vehicle door, the bracket is inserted into an internal channel defined by a body of the absorption member such that the bracket is received in an interference (e.g., friction) fit, thereby fixedly securing the absorption member to the bracket. To further facilitate a secured connection of the absorption member to the bracket, in certain embodiments, it is envisioned that the absorption member may include one or more (internal) stabilizers (e.g., ribs) that extend from the body of the absorption member inwardly into the internal channel. In such embodiments, during connection of the absorption member to the bracket, the stabilizer(s) may be deformed (e.g., compressed), thereby enhancing the interference fit between the absorption member and the bracket. To promote consistent, repeatable placement and/or securement of the absorption member, in certain embodiments, the absorption member may further include a location element (e.g., a foot) that extends outwardly from the body. For example, it is envisioned that the location element may extend from the body so as to define a receiving space that is configured to accommodate, or otherwise engage, the bracket (and/or any fasteners used to secure the bracket within the vehicle door).

FIGS. 1 and 2 illustrate an example vehicle door D defining a cavity C. The vehicle door D includes a window (not shown) that is movable through a guide channel GC during opening and closing, as well as a locking mechanism L that is movable between (first and second) locked and unlocked positions, and a variety of other commonly known internal components. The guide channel GC, and, thus, the window, is supported by (e.g., is connected to) a bracket B including one or more fasteners F (e.g., bolts) that fix the bracket B to the vehicle door D.

With reference now to FIGS. 3-7 as well, various embodiments of the presently disclosed absorption member (which is identified by the reference character 100) will be described. Although shown and described herein in connection with a single vehicle door D, it should be appreciated that the absorption members 100 may be incorporated in a variety of locations in a single vehicle (e.g., in each vehicle door D, the tailgate, etc.). As such, a vehicle including multiple absorption members 100 is contemplated herein. Additionally, while the absorption member 100 is described herein as being mountable (connectable) to the bracket B proximate (e.g., near or adjacent to) the locking mechanism L, it should be appreciated that, in alternate embodiments of the disclosure, the absorption member 100 may be configured for mounting (connection) to a variety of different structures (e.g., struts, supports, braces, etc.) within the vehicle door D, either in addition to, or instead of, the bracket B.

As mentioned above, the absorption member 100 is configured to absorb energy from an impact with the vehicle door D (e.g., during a side-impact with another vehicle), and may include (e.g., may be formed from) any material (or combination of materials) suitable for this intended purpose using any suitable manufacturing process (e.g., injection molding, casting, die cutting, 3-D printing, etc.). For example, it is envisioned that the absorption member 100 may include (e.g., may be formed from) a material that is either resiliently or non-resiliently deformable, such as a foam (e.g., an expanded polypropylene foam), rubber, polymer(s), etc.

The absorption member 100 includes a body 102 defining an outer surface 104. In the particular embodiment illustrated throughout the figures, the outer surface 104 of the body 102 defines a series of faces 106i-106vi that are arranged into pairs extending in generally parallel relation. More specifically, as seen in FIG. 3, for example, the face 106i extends in generally parallel relation to the face 106ii, the face 106iii extends in generally parallel relation to the face 106iv, and the face 106v extends in generally parallel relation to the face 106vi, whereby the body 102 defines a generally hexagonal cross-sectional configuration. It should be appreciated, however, that the specific geometrical configuration (and/or dimensions) of the absorption member 100 may be varied in alternate embodiments of the disclosure depending upon, for example, spatial requirements, the particular configuration of the vehicle door D, the particular configuration of the bracket B, etc. For example, in alternate embodiments of the disclosure, it is envisioned that the cross-sectional configuration of the absorption member 100 may be generally square-shaped, rectangular, octagonal, annular, elliptical, triangular, trapezoidal, etc.

The body 102 defines an internal channel 108 that is configured to receive the bracket B (or other suitable structure in the vehicle door D) to facilitate mounting (connection) of the absorption member 100 to the bracket B, as described in further detail below. Depending upon the particular configuration of the vehicle door D, spatial constraints, the assembly process, etc., it is envisioned that the absorption member 100 may be mounted to the bracket B either prior or subsequent to connection of the bracket B to the vehicle door D.

In the particular embodiment of the disclosure illustrated throughout the figures, the internal channel 108 includes respective first and second sections 110*i*, 110*ii* (FIGS. 5, 6) that are configured in correspondence with respective first and second portions Bi, Bii of the bracket B. More specifically, the respective sections 110*i*, 110*ii* of the internal channel 108 extend along axes Xi, Xii, and the respective portions Bi, Bii of the bracket B extend along axes XBi, XBii, wherein the axes Xi, Xii intersect so as to subtend an angle α (FIG. 5) that generally lies within the range of approximately 115° to 155° (e.g., 135°), and the axes XBi, XBii intersect so as to subtend a corresponding angle β that also generally lies within the range of approximately 115° to 155° (e.g., 135°). It should be appreciated, however, that the specific configuration and dimensions of the bracket B, and, thus, the specific configuration and dimensions of the internal channel 108, may be varied in alternate embodiments without departing from the scope of the present disclosure. For example, variations on the absorption member 100 and the bracket B in which the angles α, β deviate from the range specified above (e.g., an embodiment in which the angles α, β are approximately 90°) are also contemplated herein, as are embodiments in which both the bracket B and the internal channel 108 are generally linear (straight) or arcuate in configuration.

The internal channel 108 defines a width W (FIG. 4) that is less than a corresponding width WB (FIG. 5) defined by the bracket B, which allows the bracket B to be received by the absorption member 100 in an interference (e.g., friction) fit, thus obviating the need for any adhesive, mechanical fasteners, or the like, and reducing the complexity and cost associated with assembly. More specifically, as the absorption member 100 is mounted to the bracket B, the body 102 (e.g., the internal channel 108) is expanded (deformed), which creates an inwardly-directed biasing force X (FIG. 5) that fixes the absorption member 100 in relation to the bracket B. To further enhance the engagement between the absorption member 100 and the bracket B, in certain embodiments, it is envisioned that the absorption member 100 may include one or more stabilizers 112 (FIGS. 5, 6) that extend inwardly from the body 102 into the internal channel 108. Although illustrated as a series of generally linear ribs 114, it is envisioned that the particular configuration of the stabilizer(s) 112 may be varied in alternate embodiments of the disclosure. For example, the stabilizer(s) 112 may include an arcuate profile, or, instead, may be configured as one or more detents (or other such surface projections). Additionally, although shown as being integrally (e.g., monolithically) formed with the body 102 of the absorption member 100 throughout the figures, and, thus, as being formed from the same material as the absorption member 100, in certain alternate embodiments, it is envisioned that the stabilizer(s) 112 may be formed as discrete structures that are attached to the body 102 of the absorption member 100 (e.g., via an adhesive). In such embodiments, it is envisioned that the stabilizer(s) 112 may include (e.g., may be formed from) any suitable material or combination of materials (e.g., metallic materials, polymeric materials, rubberized materials, etc.), and, thus, that the body 102 and the stabilizer(s) 112 may be formed from different materials.

In certain embodiments, it is envisioned that the stabilizer(s) 112 may be configured and/or positioned in correspondence with surface features (or other topographical elements) defined by the bracket B. For example, it is envisioned that the stabilizer(s) 112 may be configured and positioned for insertion into corresponding openings, recesses, channels, or the like defined by (or formed in) the bracket B to promote mating engagement between the absorption member 100 and the bracket B.

Figure 5:
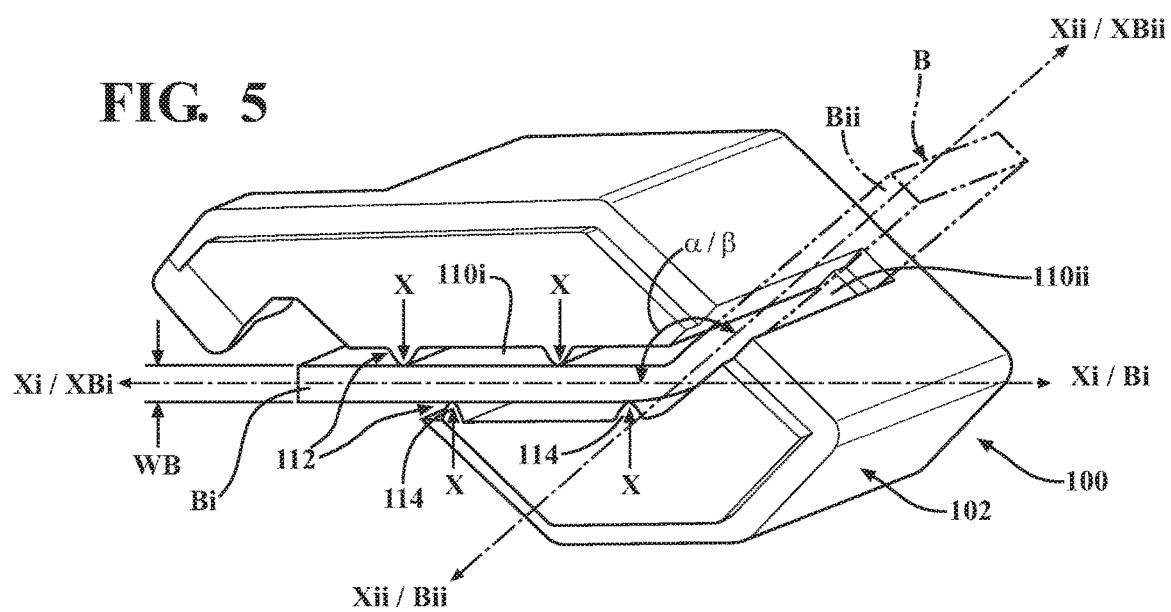
FIG. 5 is a partial, bottom, perspective view of the absorption member shown mounted to the bracket (depicted partially in phantom).
Figure 6:
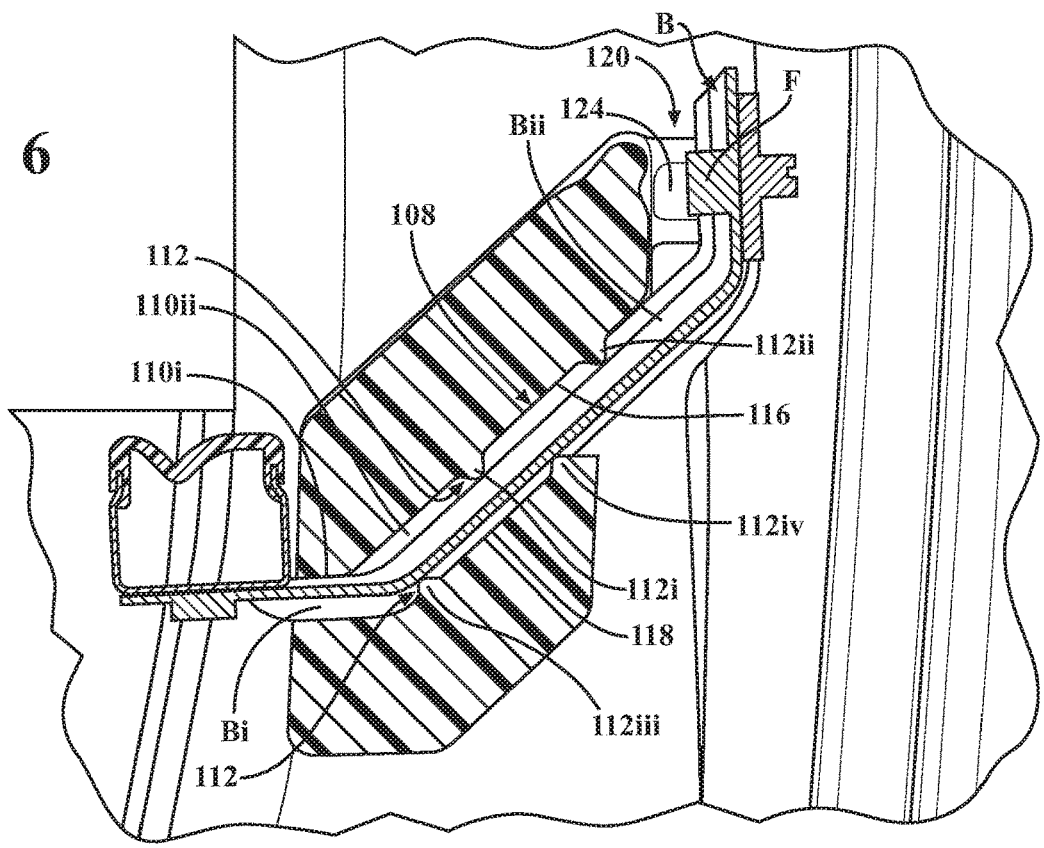
FIG. 6 is a top, cross-sectional view of the absorption member shown mounted to the bracket.

In the particular embodiment shown throughout the figures, the absorption member 100 is illustrated as including four stabilizers 112*i*-112*iv* (FIG. 6) that are spaced intermittently along the length of the internal channel 108. More specifically, as seen in FIGS. 5 and 6, the stabilizers 112 are arranged into a first pair of stabilizers 112*i*, 112*ii* that extend inwardly from a (first) surface 116 of the body 102, and a second pair of stabilizers 112*iii*, 112*iv* that extend inwardly from a (second) surface 118 that generally faces the (first) surface 116. Although the stabilizers 112*i*, 112*ii* are shown as being offset from the stabilizers 112*iii*, 112*iv* along the length of the internal channel 108, in alternate embodiments of the disclosure, it is envisioned that the particular spacing and/or location of the stabilizers 112 may be varied. For example, in certain embodiments, it is envisioned that the stabilizers 112*i*, 112*ii* may be positioned opposite (e.g., diametrically opposite) the stabilizers 112*iii*, 112*iv*. Additionally, depending upon the particular configuration of the bracket B, for example, it is envisioned that the number of stabilizers 112 included on the absorption member 100 may be varied. As such, embodiments including both greater and fewer numbers of stabilizers 112 are contemplated herein.

Figure 7:
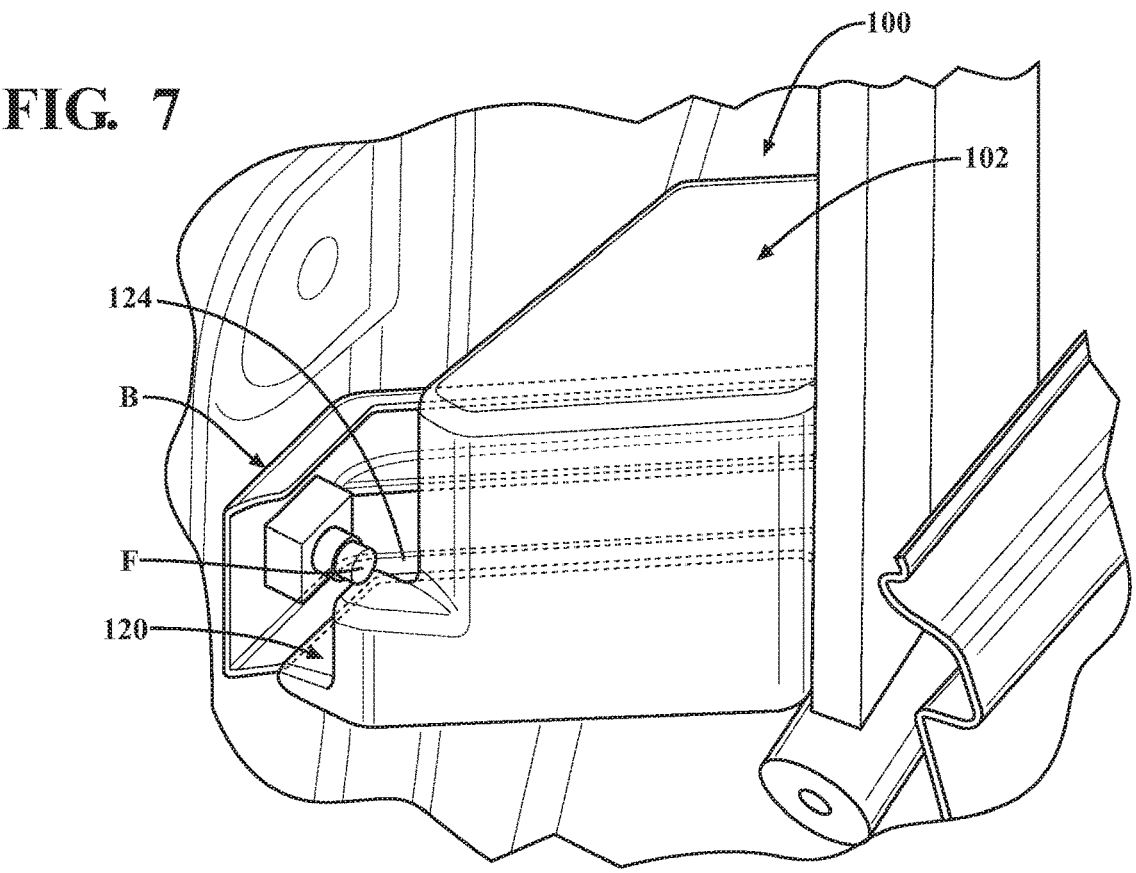
FIG. 7 is a top, perspective view of the absorption member shown mounted to the bracket.

As shown throughout the figures, in certain embodiments, the absorption member 100 may further include a location element 120 (FIGS. 3, 4, 6, 7) to promote consistent, repeatable placement of the absorption member 100 and engagement with the bracket B. For example, in the illustrated embodiment, the location element 120 is configured as a foot 122 that extends outwardly from the body 102 so as to engage the bracket B (e.g., the fastener(s) F), as seen in FIGS. 6 and 7, for example. More particularly, the foot 122 and the body 102 collectively define a receiving space 124 (e.g., channel, recess, depression, etc.) that is configured to receive (or otherwise accommodate) the bracket B (e.g., the fastener(s) F). In certain embodiments, it is envisioned that the location element 120 may be configured to provide feedback during connection of the absorption member 100 to the bracket B to signal proper placement. For example, the receiving space 124 may be configured to receive the bracket B (e.g., the fastener(s) F) such that the bracket B (and/or the fastener(s) F) snap into place, thereby providing tactile feedback (e.g., via a reduction resistance) and/or audible feedback.

Although the foot 122 is shown as extending from a lower portion 126 (FIGS. 3, 4) of the body 102 in the illustrated embodiment, such that the foot 122 is positionable below (beneath) the bracket B (e.g., the fastener(s) F), depending upon the particular configuration of the bracket B, the orientation of the bracket B in the vehicle door D, etc., it is envisioned that the position of the location element 120 may be varied. For example, an embodiment in which the location element 120 extends from an upper portion 128 of the body 102, such that the foot 122 is positionable above the bracket B (e.g., the fastener(s) F), would not be beyond the scope of the present disclosure.

In the particular embodiment of the absorption member 100 shown throughout the figures, with reference to FIG. 4, for example, the foot 122 includes a non-uniform cross-sectional configuration defining a variable height H. More specifically, the foot 122 includes a body portion 130 defining a height Hi, and an extension 132 defining a height Hii that projects outwardly from the body portion 130. Again, depending upon the particular configuration of the bracket B, the orientation of the bracket B in the vehicle door D, etc., it is envisioned that the configuration of the foot 122 may be varied. For example, an embodiment devoid of the extension 132 (e.g., an embodiment in which the foot 122 is generally uniform in configuration) would not be beyond the scope of the present disclosure. To assist in placement and proper orientation of the foot 122, the body portion 130 and/or the extension 132 may include radiused edges, as seen FIG. 4, to help guide the foot 122 during placement of the absorption member 100.

With reference now to FIGS. 1-7, methods of assembling the vehicle door D (FIG. 1), and connecting the absorption member 100 to the vehicle door D, will be discussed. As seen in FIG. 1, the bracket B is positioned and secured to the vehicle door D (via the fasteners F) so as to support the guide channel GC, and, thus, the window (not shown) as the window moves through the guide channel GC during opening and closing. Either prior or subsequent to connection of the bracket B to the vehicle door D, the absorption member 100 is mounted to the bracket B. As mentioned above, in certain embodiments, it is envisioned that the absorption member 100 may be mounted to the bracket B prior to installation of the bracket B in the vehicle door D such that the bracket B and the absorption member 100 are connected to the vehicle door D at the same time. Alternatively, it is envisioned that the bracket B may be secured to the vehicle door D, and that the absorption member 100 may be thereafter mounted to the bracket B in the manner described herein.

To mount the absorption member 100 to the bracket B, the location element 120 is positioned beneath the bracket B, and the internal channel 108 is aligned with the bracket B. More specifically, as seen in FIGS. 5 and 6, in the illustrated embodiment, the absorption member 100 is positioned such that the first section 110i of the internal channel 108 is aligned with the first portion Bi of the bracket B, and the second section 110ii of the internal channel 108 is aligned with the second portion Bii of the bracket B. The absorption member 100 is then press-fit onto the bracket B, which deforms the body 102 (e.g., via expansion of the internal channel 108 and/or compression of the stabilizers 112) to thereby create the biasing force X (FIG. 5) and fix the absorption member 100 to the bracket B.

After connecting the absorption member 100 to the bracket B, the fastener(s) F may be inserted into the bracket B to secure the bracket B to the vehicle door D. As mentioned above, in certain embodiments, the receiving space 124 may be configured to receive or otherwise accommodate the fastener(s) F, as seen in FIGS. 6 and 7, for example. Depending upon the particular configuration and dimensions of the body 102 and the location element 120, and the configuration and dimensions of the fastener(s) F, it is envisioned that the interface between the body 102 and the fastener(s) F may serve to enhance the connection between the absorption member 100 and the bracket B to further secure the absorption member 100 in place.

After being mounted to the bracket B, the absorption member 100 is positioned to absorb energy from an impact with the vehicle (e.g., a side-impact with another vehicle), and thereby mitigate (if not entirely prevent) collapse of the door cavity and/or damage to the various internal components of the vehicle door D (e.g., the locking mechanism L, the guide channel GC, etc.). Additionally, it is envisioned that the absorption member 100 may be configured and positioned to transmit and/or distribute energy from the impact to force the passenger(s) away from the vehicle door D, and thereby protect the passenger(s) from the force of the impact.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments. For example, although generally discussed in the context of the front-end of the vehicle V (FIG. 1) herein, as mentioned above, it should be appreciated that any of the various embodiments of the presently disclosed energy absorber may be utilized in the rear-end of the vehicle V as well.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:
1. A vehicle door, comprising:
   a bracket configured to support a window during opening and closing;
   a door locking mechanism positioned proximate the bracket; and an absorption member including a body defining an internal channel configured to receive the bracket in an interference fit such that the absorption member is fixedly securable to the bracket, the absorption member being configured and positioned to absorb energy from an impact with the vehicle door to thereby protect the door locking mechanism.

2. The vehicle door of claim 1, wherein the body of the absorption member includes a deformable material.

3. The vehicle door of claim 2, wherein the body of the absorption member includes an expanded polypropylene foam.

4. The vehicle door of claim 1, wherein the absorption member includes a plurality of stabilizers extending inwardly from the body into the internal channel.

5. The vehicle door of claim 4, wherein the plurality of stabilizers are configured as ribs.

6. The vehicle door of claim 4, wherein the plurality of stabilizers includes a first stabilizer extending inwardly from a first surface of the body and a second stabilizer extending inwardly from a second surface of the body, the second surface generally facing the first surface.

7. The vehicle door of claim 1, wherein the internal channel includes a first portion extending along a first axis and a second portion extending along a second axis intersecting the first axis so as to subtend an angle that lies substantially within a range of approximately 115° to 155°.

8. The vehicle door of claim 1, wherein the absorption member further includes a location element extending outwardly from the body, the location element being configured for engagement with the bracket.

9. The vehicle door of claim 8, wherein the location element extends from the body so as to define a receiving space configured to accommodate the bracket.

10. The vehicle door of claim 9, wherein the location element extends from the body such that the location element is positionable beneath the bracket upon securement of the absorption member to the bracket.

11. An absorption member configured for mounting proximate a locking mechanism of a vehicle door including a window supported by a bracket during opening and closing, the absorption member comprising:
a body including a deformable material and being configured to absorb energy from an impact with the vehicle door to thereby protect the locking mechanism, the body including an internal channel configured to receive the bracket, wherein the internal channel defines a first width and the bracket defines a second width greater than the first width such that upon insertion of the bracket into the internal channel, the internal channel is expanded to create an interference fit with the bracket to thereby secure the absorption member to the bracket.

12. The absorption member of claim 11, wherein the body includes an expanded polypropylene foam.

13. The absorption member of claim 11, wherein the absorption member includes a plurality of internal stabilizers configured for contact with the bracket.

14. The absorption member of claim 13, wherein the plurality of internal stabilizers are configured as ribs extending inwardly into the internal channel.

15. The absorption member of claim 11, wherein the absorption member further includes a location element extending outwardly from the body, the location element being configured for engagement with the bracket.

16. The absorption member of claim 15, wherein the location element extends from the body so as to define a receiving space configured to accommodate the bracket.

17. A method of assembling a vehicle door, the method comprising:
positioning a window guide channel within the vehicle door;
fixedly connecting a bracket to the vehicle door such that the bracket supports the window guide channel; and
mounting an absorption member to the bracket via insertion of the bracket into a channel defined by the absorption member such that the bracket is received in an interference fit to thereby secure the absorption member to the bracket.

18. The method of claim 17, wherein mounting the absorption member to the bracket includes deforming a plurality of internal stabilizers via engagement with the bracket.

19. The method of claim 18, wherein mounting the absorption member to the bracket includes positioning the absorption member such that a first internal stabilizer is positioned adjacent a first side of the bracket, and a second internal stabilizer is positioned adjacent a second, opposite side of the bracket.

20. The method of claim 17, wherein mounting the absorption member to the bracket includes positioning the absorption member such that a location element extending outwardly from a body of the absorption member engages the bracket.

* * * * *